(12) United States Patent  
Quintana et al.

(10) Patent No.: US 6,522,531 B1
(45) Date of Patent: Feb. 18, 2003

(54) APPARATUS AND METHOD FOR USING A WEARABLE PERSONAL COMPUTER

(76) Inventors: W. Vincent Quintana, 712 High St., Bath, ME (US) 04530; F. Christopher Mitchell, 4846A S. 28th St., Arlington, VA (US) 22206; Harry P. Winer, 86 Ann Marie Dr., Holliston, MA (US) 01746

( * ) Notice: Subject to any disclaimer, the term of this patent is extended or adjusted under 35 U.S.C. 154(b) by 0 days.

(21) Appl. No.: 09/696,758

(22) Filed: Oct. 25, 2000

(51) Int. Cl.$^7$ ................................................ H05K 7/02
(52) U.S. Cl. .................... 361/683; 345/8; 342/357; 379/433
(58) Field of Search .................. 361/683, 724–727, 361/730; 379/433; 359/630; 364/708.1; 345/7–8; 342/357

(56) References Cited

U.S. PATENT DOCUMENTS

| | | | |
|---|---|---|---|
| 4,976,387 A | 12/1990 | Spianti ........................ 224/662 |
| 5,124,915 A | 6/1992 | Krenzel ........................ 364/420 |
| 5,305,244 A | 4/1994 | Newman et al. .......... 364/708.1 |
| 5,533,097 A | 7/1996 | Crane et al. .................... 379/58 |
| D385,855 S | 11/1997 | Ronzani .................... D14/100 |
| 5,691,713 A | 11/1997 | Ishida .................... 340/870.01 |
| D387,898 S | 12/1997 | Ronzani ..................... D3/215 |
| 5,699,244 A | 12/1997 | Clark, Jr. et al. ........... 364/420 |
| D390,552 S | 2/1998 | Ronzani .................... D14/124 |
| 5,719,743 A | 2/1998 | Jenkins et al. .............. 361/683 |
| 5,719,744 A | 2/1998 | Jenkins et al. .............. 361/683 |
| 5,726,660 A | 3/1998 | Purdy et al. ................. 342/357 |
| 5,757,339 A | 5/1998 | Williams et al. ................. 345/8 |
| 5,774,338 A | 6/1998 | Wessling, III .............. 361/730 |
| 5,831,198 A | 11/1998 | Turley et al. ................. 89/1.11 |
| 5,844,656 A | 12/1998 | Ronzani et al. ............. 351/158 |
| 5,844,824 A * | 12/1998 | Newman et al. ......... 364/708.1 |
| 5,893,037 A | 4/1999 | Reele et al. ................. 455/556 |
| D411,179 S | 6/1999 | Toyosato .................... D14/100 |
| 5,948,047 A | 9/1999 | Jenkins et al. .............. 708/141 |
| 5,983,073 A | 11/1999 | Ditzik ........................ 455/11.1 |
| 5,995,936 A | 11/1999 | Brais et al. .................. 704/205 |
| 5,999,952 A | 12/1999 | Jenkins et al. .............. 708/100 |
| 6,023,241 A | 2/2000 | Clapper .................. 342/357.13 |
| 6,029,183 A | 2/2000 | Jenkins et al. .............. 708/100 |
| 6,049,813 A | 4/2000 | Danielson et al. .......... 708/100 |
| D423,761 S | 5/2000 | Ng et al. ..................... D2/829 |
| 6,057,966 A * | 5/2000 | Carroll et al. .............. 359/630 |
| 6,260,202 B1 | 7/2001 | Villalobos et al. ............... 2/12 |
| 6,285,757 B1 * | 9/2001 | Carroll et al. .............. 379/433 |
| 6,292,213 B1 | 9/2001 | Jones .......................... 348/61 |
| 6,305,587 B1 | 10/2001 | Miller ........................ 224/153 |

OTHER PUBLICATIONS

"Case Study—Shipbuilder Trims Inspection and Troubleshooting Time by 70%," ViA, Inc. web site (www.via–pc.com), 5/00 (precise date of publication unknown), published by ViA, Inc., Burnsville, Minnesota.

Steve Ditlea, "The PC goes ready–to–wear," IEEE Spectrum, vol. 37, No. 10, Oct. 2000, (pages unknow—available online at www.spectrum.ieee.org).

* cited by examiner

Primary Examiner—Darren Schuberg
Assistant Examiner—Hung Van Duong
(74) Attorney, Agent, or Firm—Jenner & Block, LLC (57) ABSTRACT

An apparatus and method for using a wearable personal computer that uses a camera, display, protective casing for the display, a computer, a protective casing for the computer, a battery, a protective casing for the battery, and a harness to support the computer and battery from the body of a person using the apparatus.

67 Claims, 4 Drawing Sheets

FIG. 2

APPARATUS AND METHOD FOR USING A WEARABLE PERSONAL COMPUTER

CROSS REFERENCE TO RELATED APPLICATIONS

This application is directed to subject matter that is related to the subject matter of U.S. patent application Ser. No. 09/721,091 for "Apparatus and Method for Using a Wearable Computer In Collaborative Applications" filed Nov. 22, 2000 and U.S. patent application Ser. No. 09/739,136 for "Apparatus and Method for Using a Wearable Computer in Testing and Diagnostic Applications" filed Dec. 18, 2000.

BACKGROUND OF THE INVENTION

1. Field of the Invention

The present invention relates generally to a wearable personal computer, and more particularly to a fire resistant wearable personal computer for use by a fire fighter while fighting a fire.

2. Description of the Related Art

The outbreak of a fire can simultaneously cause fear, panic, and chaos within a matter of seconds. People need to react fast, and fire fighters who are there to save these people need to react even faster. Fighting fires is not an easy job in any setting, but is especially difficult on a ship or other confined space such as an offshore oil rig. Challenges faced by fire fighters, especially onboard ships and in other confined areas, include restricted escape areas and not knowing the extent of the fire. The delays in fighting a fire caused by these challenges can result in a heavy loss of merchandise and equipment and may even result in the loss of life.

The traditional equipment used by fire fighters, such as a United States Navy Fire Fighting Ensemble, consists of a fire suit, a helmet, air packs, and a wireless radio. In addition, some fire fighters wear location devices that enable a team leader to monitor the locations of the fire fighters. However, there exists a continuing need to provide more information to fire fighting team leaders (hereinafter "team leaders") such as the precise location of fires within a confined area and the extent of damage that a fire has caused. In addition, there exists a continuing need for more effective communication between team leaders and fire fighters. For example, if a team leader could transmit a plan view of the structure where a fire has broken out that displays the precise areas where the fire is located, as well as unobstructed escape routes, fire fighters would be able to extinguish the fire in a more expedient and safe manner.

Wearable personal computers are personal computers that may be worn on the body of the person operating the computer. Wearable personal computers are preferred when there is insufficient space to set up a lap top or desktop personal computer. In addition, wearable personal computers may be adapted to use wireless communications to exchange data with a remote computer system. However, the use of conventional wearable personal computers is limited by the environmental surroundings in which they will be used. This is especially true in a fire fighting scenario where the presence of high temperatures and moisture, as well as quick physical movements and collisions with the user's body, would preclude the use of a conventional wearable computer.

Therefore, it would be desirable to have a wearable personal computer that is adapted to withstand the rigors of fire fighting or other emergency situations that would increase the communication and exchange of critical information between a fire fighter and a team leader and other fire fighters.

SUMMARY OF THE INVENTION

The present invention is an apparatus and method for using a wearable personal computer in a fire fighting application or other harsh environment application involving, for example, a high temperature and/or spray environment. The present invention can be used for the following functions: providing real time video and voice communication over a wireless local area network (LAN) or other wireless communication system; providing interactive collaboration between a team leader and fire fighters through access to drawings and technical manuals using wireless communication; preparing standardized inspection reports that are electronically filed; remote activation and monitoring of machinery and/or remote sensor devices using wireless communication; using "reasoning software" to assist in fire fighting and rescue applications and solutions; automatically alerting fire fighters of hazards in the environment that they are entering; monitoring the health of fire fighters using telemetry devices such as sensors imbedded in the present invention; recording fire fighters' actions for review and future training purposes; and using augmented reality software applications to assist in fire fighting.

In a preferred embodiment, the present invention comprises a camera adapted to be water resistant, a display unit housed in a flame and heat resistant insulation casing, a battery housed in a heat resistant casing, a wearable personal computer, and means for supporting the battery and computer from the body of the person using the present invention. The present invention allows a fire fighter to use wireless communication to transmit real time video and voice data as well as other information to a remote team leader. The present invention further allows a team leader to use wireless communication to transmit critical information such as escape routes and floor plans to the fire fighter.

In one embodiment of the present invention, the invention further includes a radio frequency identification tag to provide location and tracking data of the fire fighter to the control team leader. In another embodiment of the present invention, the use of a separate radio frequency identification tag is eliminated by incorporating radio frequency tracking hardware and software into the computer. Other tracking devices can be used, as well.

In another embodiment of the present invention, an infrared camera enables both the fire fighter and team leader to see through smoke and locate the hottest parts of the fire.

DETAILED DESCRIPTION OF THE PREFERRED EMBODIMENT

The present invention is a method and apparatus for using a wearable personal computer in fire fighting situations or other harsh environment applications involving, for example, a high temperature and/or spray environment. For example, the present invention can be used in maritime, structural, aircraft crash rescue, hazardous materials, and wildland operations. The present invention permits a team leader or person in a supervisory or coordinating role in a fire fighting situation (hereinafter "team leader") to monitor the progress being made by each individual fire fighter. The present invention allows the team leader to monitor the precise location of each fire fighter in real time, to visually observe the conditions that each fire fighter is encountering, to communicate with each fire fighter, and to provide critical information such as floor plans and escape routes to each fire fighter. In addition, the present invention can include sensors that monitor the fire fighter's blood pressure or other vital statistics, the internal temperature of the fire protective garment, and the ambient temperature. This data can also be transmitted to the team leader using wireless LAN communication or any other suitable wireless communication system.

Figure 1:
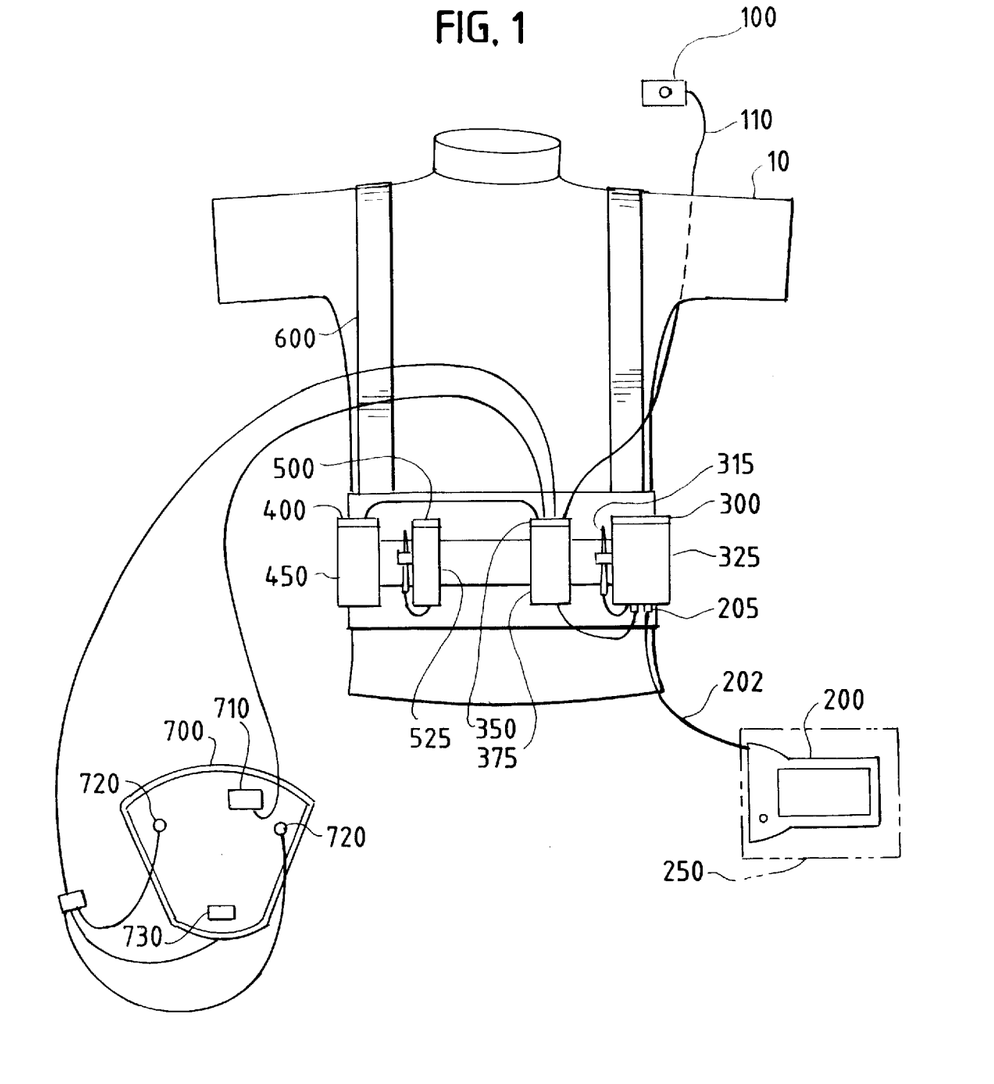
FIG. 1 is an overall schematic diagram of the present invention as worn on the body of a person.
Figure 2:
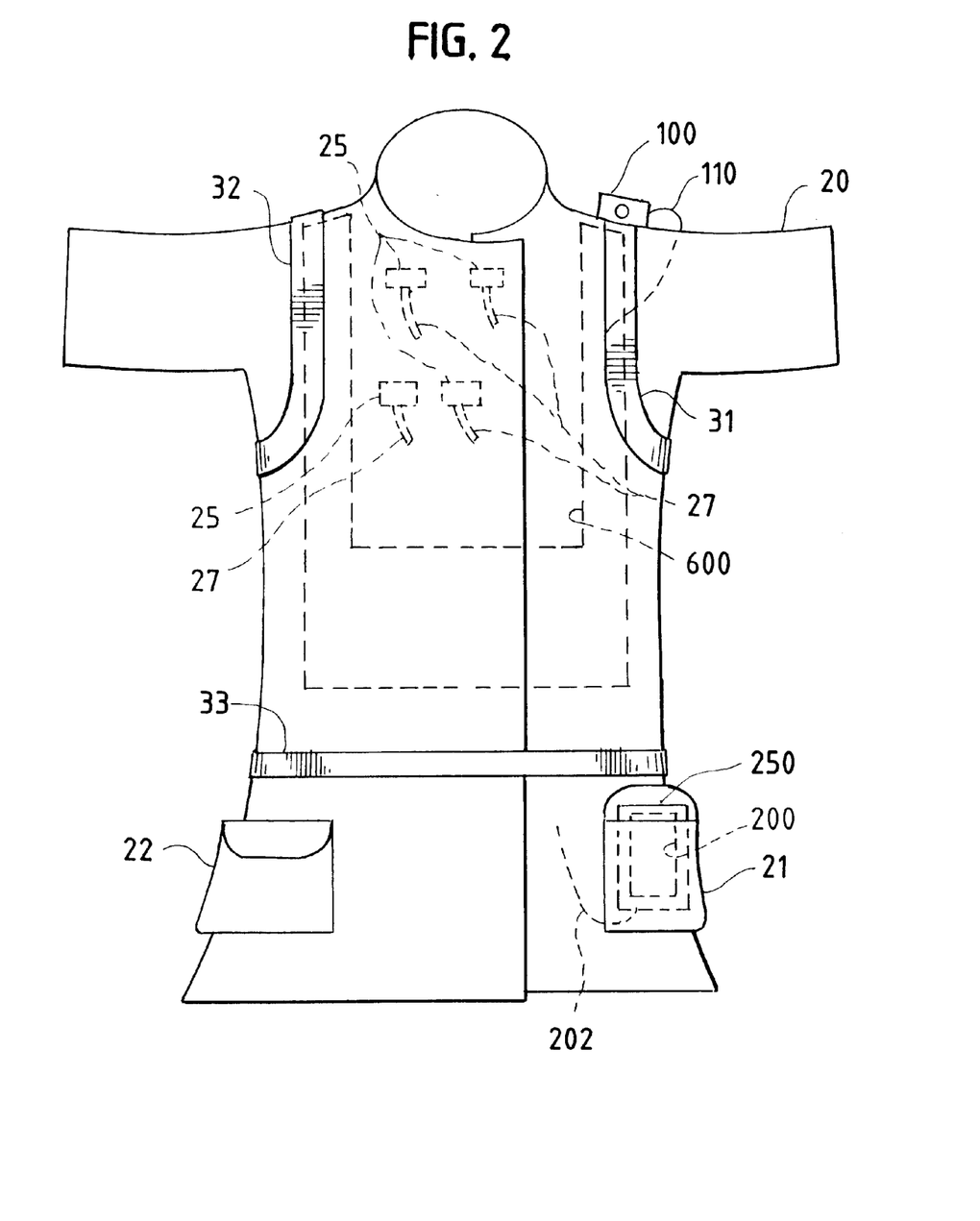
FIG. 2 is a schematic diagram of fire protective gear according to the present invention.

Referring to FIG. 1, the present invention comprises a camera 100, a display unit 200 housed in a protective display casing 250, a computer 300 housed in a protective computer casing 325, an input/out (I/O) box 350 housed in a protective I/O box casing 375, a battery 400 housed in a protective battery casing 450, a radio frequency (RF) identification tag 500 housed in a protective RF ID tag casing 525, and a harness 600 that supports these components from the body 10 of the person wearing the apparatus. Also as shown in FIG. 1, the present invention may comprise a face mask 700 that has a head mounted display 710, audio speakers 720, and a microphone 730 installed in face mask 700. As shown in FIG. 2, the present invention preferably is adapted to be used in conjunction with a protective garment, such as fire protective gear (FPG) 20 or other fire and heat resistant garments. Harness 600 preferably is worn beneath FPG 20 and preferably is positioned so that harness 600 will not interfere with straps 31, 32, and 33 of an air pack or other external device that might be worn over FPG 20. Camera 100 preferably is mounted upon strap 31 or 32.

Display unit 200, which is housed in protective display casing 250, preferably is stored in a pocket 21 of FPG 20. Of course, the foregoing components can be carried in other suitable manners as well.

1. Camera

Referring to FIG. 1, camera 100 collects real time images that preferably are transmitted to the team leader over a wireless local area network (LAN) connection. The images from camera 100 are transmitted over video cable 110 to I/O box 350 and then to computer 300 for transmission via wireless communication to a remote station (not shown). In one embodiment of the present invention, video cable 110 is a USB cable. However, video cable 110 may also be a USB v. 2.0 or "firewire" interface. In an alternate embodiment of the present invention that does not incorporate I/O box 350, the images from camera 100 are transmitted via video cable 110 directly to computer 300. As shown in FIG. 2, camera 100 preferably is mounted upon equipment shoulder strap 31 or 32 of FPG 20. However, camera 100 may be mounted at any suitable location on FPG 20 or the body of the person using the present invention.

In a preferred embodiment of the present invention, camera 100 is a 3Com Home Connect web camera, available from 3Com, Inc., 5400 Bayfront Plaza, Santa Clara, Calif., 95052-8145. The 3Com Home Connect web camera is preferred for the present invention because of its ability to adjust to low light situations. The software drivers of this camera also fully support Microsoft Windows "plug and play," making the camera fully compatible with the present invention, as will be discussed further below.

Notwithstanding, several modifications preferably are made to the 3Com Home Connect web camera for its use as camera 100 in the present invention. To insure the camera's water resistance, the video cable 110 to camera 100 connection preferably is glued and sealed using epoxy and the entire camera assembly is then sealed in a rubberizing compound. To further ensure water resistance, the camera's threaded lens assembly can be glued in place, preferably using a product called "Liquid Gasket," such that the lens is frozen to focus on "infinity." Although the 3Com camera is preferred, any camera that can produce real time video images could be used as camera 100, particularly if modified as described above.

In another embodiment of the present invention, an infrared camera could be used for camera 100. The use of an infrared camera would enable the fire fighter wearing the present invention to see through smoke to maneuver through structures and locate fire fighters and other personnel, such as victims that may be incapacitated, and to distinguish the hottest parts of the fire. Likewise, the team leader monitoring the fire fighter could observe the images taken by the infrared camera because these images would be transmitted by the present invention using wireless communications. In addition, an infrared camera could be used to inspect areas for "hot spots" after it appears that a fire has been extinguished to determine whether any particular areas might need additional attention.

Although a conventional USB cable can be used with the present invention, without modification, it is preferred that as much of video cable 110 as possible is located underneath FPG 20, minimizing the exposure of video cable 110 to high temperatures. See FIG. 2. In another embodiment of the present invention, insulated cable conduits (not shown) could be used to shield video cable 110.

2. Display Unit

Figure 3:
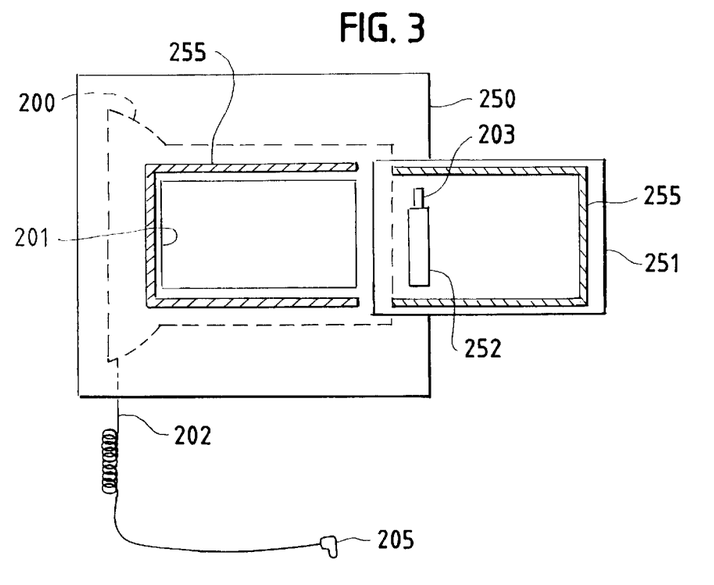
FIG. 3 is a schematic diagram of a display unit housed within a protective display casing.

As shown in FIG. 1, display unit 200 is used to exchange data with the fire fighter wearing the present invention. As shown in FIG. 3, display unit 200 preferably is housed in protective display casing 250. Referring to FIG. 2, display unit 200, which is protected inside protective display casing 250, is preferably stored in a pocket 21 of FPG 20 when display unit 200 is not being used by the fire fighter. Alternatively, display unit 200 housed in protective display casing 250 may be stored in other suitable location when not in use.

In a preferred embodiment of the present invention, display unit 200 is a ViA II PC Pen Tablet with an Indoor Readable Display, available from ViA, Inc., 12550 West Frontage Road, Ste. 201, Burnsville, Minn. 55337. The Indoor Readable Display is preferred because of its backlight feature. A Sunlight Readable Display available from ViA, Inc. may also be used as display unit 200. Display unit 200 uses a thin film transistor (TFT) display surface that combines both video and "mouse functions" into one unit. Referring to FIG. 3, the fire fighter wearing the present invention can interface with display unit 200 using a pen stylus 203 on the screen 201 of display unit 200.

As shown in FIG. 3, display unit 200 is housed in protective display casing 250 to protect display unit 200 from heat that may be encountered when the present invention is used while fighting fires. In addition, display unit 200 preferably is made water resistant by sealing the joints of display unit 200 with epoxy resin or RTV. Protective display casing 250 may be constructed from any insulation material that is fire resistant. In a preferred embodiment of the present invention, protective display casing 250 is constructed from a composite fabric comprising a carbon-fiber/air trapping nonwoven fabric called "Durosuede PYR FR 250," available from Hub Fabric Leather Co., Inc., 7 Charleton Street, P.O. Box 246, Everett, Mass. 02149, sandwiched between a top and bottom layer of silicone foam fabric. The silicone foam fabric used in this preferred embodiment comprises a silicone foam that is bonded, laminated, or cast to a fabric and is available from Shelby Specialty Gloves, 5321 East Shelby Drive, Memphis, Tenn. 38187. Protective display casing 250 further comprises a flap 251 that may be opened to expose screen 201 of display unit 200. As shown in FIG. 3, flap 251 is fastened to protective display casing 250 using fastener 255. Fastener 255 preferably is hook and piling fastening tape but may also be any other means for fastening including, without limitation, zippers, buttons, and snaps. A stylus pen holder 252 can be located on the inside surface of flap 251 to store a stylus pen 203 used by the fire fighter in interfacing with display unit 200. Sufficient space is left between the outer edge of flap 251 and fastener 255 to allow a fire fighter wearing heavy gloves to open flap 251. As an example, the outer edge of flap 251 extends approximately one inch beyond the outer edge of fastener 255 that is attached to the inner surface of flap 251.

As shown in FIG. 1, display cable 202 connects display unit 200 with computer 300. In a preferred embodiment of the present invention, display cable 202 is connected to computer 300 using a LEMO connector 205. The use of a LEMO connector provides extra durability for the connection between display 200 and computer 300 and ensures that display cable 202 will not become disconnected from computer 300 while a fire fighter is using the present invention. LEMO connectors are available from LEMO USA, Inc., 635 Park Court, Rohnert Park, Calif., 94928-2408.

Although a conventional video cable can be used with the present invention, without modification, it is preferred that as much of display cable 202 as possible is located underneath FPG 20, minimizing the exposure of display cable 202 to high temperatures. See FIG. 2. In another embodiment of the present invention, insulated cable conduits (not shown) could be used to shield display cable 202.

In another preferred embodiment of the present invention, a head mounted display can be used instead of or in conjunction with display unit 200. As shown in FIG. 1, a head mounted display 710 preferably would be embedded in a fire mask 700 worn by a fire fighter. Head mounted display 710 would be able to withstand high temperatures without additional modification because of the heat protection provided by fire mask 700. Alternatively, head mounted display 710 could be suspended from a boom worn on the fire fighter's head.

The use of head mounted display 710 would enable a fire fighter to use "augmented reality" software applications and also would enable the fire fighter to see real time infrared images taken by camera 100. Head mounted display 710 would be connected to I/O box 350, which would then connect with computer 300. A head mounted display used according to the present invention could be supplied by Liteye Microdisplay Systems, LLC, 12415 Dumont Way, Unit #103, Littleton, Colo. 80125.

Additionally, a microphone 730 and speakers 720 preferably could be used in the present invention to allow voice communication using wireless communication with the team leader or other fire fighters. Microphone 730 would facilitate the use of voice recognition software applications. As shown in FIG. 1, microphone 730 and speaker 720 preferably are mounted inside face mask 700, but could be independent of face mask 700.

3. Radio Frequency Identification Tag

As shown in FIG. 1, radio frequency (RF) identification tag 500 is used in the present invention to transmit radio frequency location data of the fire fighter wearing the present invention to the team leader or other fire fighters. Also as shown in FIG. 1, RF identification tag 500 preferably is housed in protective RF ID tag casing 525 to protect RF identification tag 500 from excessive heat and to secure it to belt 600. Preferably, protective RF ID tag casing 525 is constructed from the same material used to construct insulated display casing 250. Preferably RF identification tag 500 receives power from its own internal battery.

In one embodiment of the present invention, a ViaSat 900 mega Hertz transmitter tag, available from ViaSat, Inc., 6155 El Camino Real, Carlsbad, Calif. 92009, is used as RF identification tag 500. However, because a ViaSat transmitter tag does not provide real time RF tracking and only provides location data, other RF ID tags are preferred. In a preferred embodiment of the present invention, RF identification tag 500 is a 2.43 giga Hertz active RF ID tag manufactured by PinPoint, Inc., One Fortune Drive, Billerica, Mass. 01821. The PinPoint RF ID tag is preferred because it provides real time tracking. Alternatively, a 2.43 giga Hertz active RF ID tag made by WhereNet, Inc., 2855 Bowers Avenue, Santa Clara, Calif. 95051, could be used as RF identification tag 500.

In an alternative embodiment of the present invention, radio frequency tracking hardware and software are incorporated into computer 300, eliminating the need for separate RF identification tag 500. The incorporation of RF identification hardware into computer 300 would enable the present invention to be used with computer systems that combine the antennas for wireless LAN access points and RF ID tags into one antenna receiver, which then transmits the data to a hardwired LAN.

In another embodiment of the present invention, a GPS receiver could be used instead of the RF identification tag when the present invention is being used at locations where the signal from the RF identification tag could not be received. For example, if the present invention were used while fighting a fire in wildlands where the signal from the RF identification tag could not be transmitted to a receiver, a GPS receiver could be used in place of the RF identification tag. The GPS receiver used in this embodiment could transmit location data to computer 300, which could then transmit the data to the team leader. Computer 300 could transmit this data in various ways. If long range wireless LAN communications, such as BreezeCom, 5858 Edison Place, Carlsbad, Calif., 92008, were available, computer 300 could transmit the data using long range wireless LAN communication. If long range wireless LAN communication is not available, computer 300 could transmit the data received from the GPS receiver using satellite based communication such as that available from DirecPC, 11717 Exploration Lane, Germantown, Md., 20876. Using a GPS receiver in lieu of an RF identification tag allows the present invention to take advantage of the latest advances in broadband wireless connectivity.

4. Battery

Figure 4:
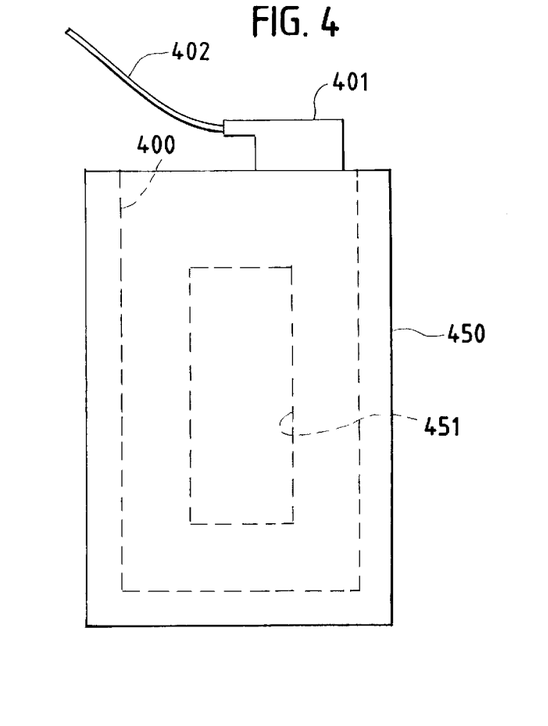
FIG. 4 is a schematic diagram of a battery housed within a protective battery casing.

As shown in FIG. 1, battery 400 is connected to I/O box 350, which then supplies power to camera 100, display unit 200, and computer 300. As shown in FIG. 4, battery 400 is housed in an insulated battery casing 450 to prevent the temperature of battery 400 from rising to a level where "thermal runaway" will occur. Thermal runaway is a condition that occurs when a battery, because of excessive discharge, overcharge, or exposure to high ambient heat temperatures, generates more heat than it can dissipate. When thermal runaway occurs, the protective coatings on the anode and cathode of the battery can begin to break down, accelerating the generation of heat within the battery. This may cause the rapid release of toxic gases. In a worst case scenario, the ABS plastic case of the battery may melt, or the buildup of gases inside the battery may cause the battery to explode. Consequently, insulated battery casing 450 is used in the present invention to prevent thermal runaway.

Protective battery casing 450 can be constructed from any insulative material, but preferably is made from the same material as protective display casing 250. Protective battery casing 450 surrounds battery 400 and also supports battery 400 from harness 600. Protective battery casing 450 is also constructed in a manner that requires battery 400 to be positioned in insulated battery casing 450 in a manner that will cause the force from any potential explosion of battery 400 to be directed away from the body of the fire fighter using the present invention. Batteries typically have a thick layer of ABS plastic on one side of the battery and a thin layer of ABS plastic on the other side. In the present invention, protective battery casing 450 preferably is designed to have the side of battery 400 with the thick layer of ABS plastic positioned against the body of the fire fighter with the thin layer of ABS plastic facing outward.

Figure 5:
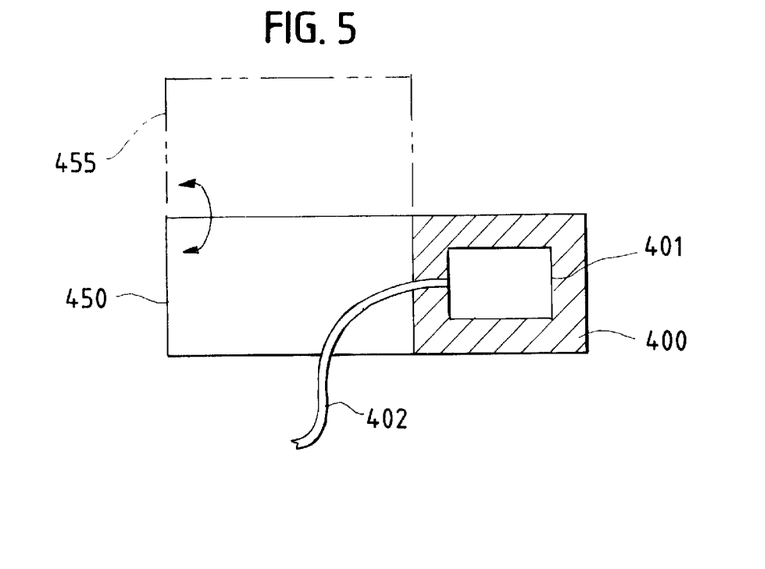
FIG. 5 is a schematic diagram of the top view of the battery housed within the protective battery casing.

As shown in FIG. 5, the top side of protective battery casing 450 preferably is designed so that battery 400 may only face one direction when housed in protective battery casing 450. Flap 455 is designed so that it may only be closed when battery 400 is inserted into protective battery casing 450 in the proper direction. If battery 400 is not facing the proper direction, battery plug 401 would prevent flap 455 from closing.

In a preferred embodiment of the present invention, two types of batteries can be used for battery 400. In actual fire fighting situations, a primary, or non-rechargeable, battery is used for battery 400. A primary battery, rather than a rechargeable battery, is used in actual fire fighting situations because there is no risk of overcharging the battery, which can result in thermal runaway, and it can withstand higher temperatures than rechargeable batteries. A primary battery in accordance with this preferred embodiment may be ordered from Matthews Battery Assemblies, 645 Hickman Circle, Sanford, Fla. 32771. In addition to providing added safety, such primary batteries are relatively inexpensive, easily disposed of because they are biodegradable, and can have long service life and long shelf life.

In training exercises using the present invention, battery 400 can be embodied as a rechargeable lithium-ion battery. The preferred battery 400 in this embodiment of the present invention is a Molicel ME202BB battery, available from E-One Moli Energy Limited, North American Sales Office and Production Facility, Maple Ridge, BC, Canada, V2X 9E7. The Molicel ME202BB is the battery that is shipped with the ViA IIR computer. The Energy Access SBS series smart battery charger that is also shipped with the ViA IIR computer is likewise preferred because it uses "smart charging technology" that allows the battery to be charged at various levels of discharge with diminished risk of developing battery "memory" or overcharging the battery.

5. Computer

As shown in FIG. 1, a computer 300 is used in the present invention to provide information to the firefighter wearing the present invention and to the team leader monitoring the fire fighter from a remote location. Computer 300 is a wearable personal computer adapted to withstand the shock that it might be subjected to while used in fire fighting. While numerous wearable personal computers capable of wireless communication could be adapted for rugged use, in a preferred embodiment of the present invention, computer 300 is a ViA IIR wearable personal computer, available from General Dynamics Information Systems, 8800 Queen Avenue South, Bloomington, Minn., 55431. The ViA IIR wearable computer is a modified version of a standard ViA IIB wearable personal computer available from ViA, Inc., 12550 West Frontage Road, Suite 201, Burnsville, Minn. 55337.

A ViA IIR preferably is used as computer 300 because it is "hardened" to withstand a greater shock than a conventional wearable personal computer can be expectd to withstand. In addition to the ViA IIR, any other wearable personal computer that has been "hardened" to withstand greater shock than a conventional wearable personal computer may be used as computer 300.

The ViA IIR takes the basic core unit of a commercial ViA IIB and consolidates it into a 3.8"×5.9"×1.6" box machined from a solid block of aluminum. A hollow cell is machined into the box containing the motherboard, processor, chipset, RAM and all other associated electronic components. This cell is waterproof and the motherboard is designed to use the thermal mass of its container as a heat sink.

To further enhance high heat performance, a cooling tunnel, located adjacent to the processor cell, is incorporated into the design of the ViA IIR. The tunnel contains a large aluminum heat sink and a compact cooling fan generating a steady air stream over its fins. In order to facilitate air exchange, the cooling tunnel is not sealed. The cooling fan is rugged enough to withstand repeated exposures to water and can be easily replaced if it is damaged. Preferably, a cooling fan providing greater airflow than the fan used in a standard ViA IIB is used to provide increased cooling capacity, thus allowing the ViA IIR to operate in a high temperature environment. A Cyrix processor preferably is used in the ViA IIR because of its lowpower draw resulting in longer battery life and cooler running temperatures. This makes the ViA IIR preferable over other conventional wearable personal computers that use Intel and AMD processors that generally consume more power than the Cyrix processor.

The ViA IIR preferably is used for computer 300 because it is possesses the following capabilities. The ViA IIR is Microsoft Windows 9X compatible, and currently uses Windows 98 as its operating system. In addition, the ViA IIR is also capable of using Windows NT 4.0 as its operating system. The ViA IIR has an internal PCMCIA slot to accommodate a 100 mW wireless LAN card. Using, for example, an Aironet wireless communication system, available from Cisco Systems, Inc., 170 West Tasman Drive, San Jose, Calif., 95134, computer 300 is able to transmit and receive data over a wireless LAN connection using the IEEE 802.11 protocol. The wireless LAN connection permits the fire fighter wearing the present invention to exchange data with a team leader who is positioned at a remote location. The wireless LAN connection likewise supports voice communication between the fire fighter wearing the present invention and the team leader or other fire fighters. The wireless LAN connection further supports the transmission of real time video data between the fire fighter and the team leader or other fire fighters. Wireless LAN communications are made from computer 300 using computer RF antenna 315. Although the ViA IIR is preferred, computer 300 can comprise another wearable personal computer that may or may not embody all of the foregoing capabilities.

Computer 300 uses software that allows the fire fighter wearing the present invention and a team leader to exchange data to maximize the fire fighter's efficiency in extinguishing and/or controlling the fire. Computer 300 preferably enables a fire fighter to use the following applications and features. The fire fighter and team leader can have real time wireless video and voice communication. The fire fighter and team leader can engage in interactive collaboration through a graphical interface and access floor plans, drawings, and technical manuals using wireless communication. The fire fighter can prepare standardized inspection reports that are electronically filed. The fire fighter or team leader can remotely activate and monitor machinery and remote sensing devices using wireless communication. The fire fighter and team leader can use "reasoning software" to assist in fire fighting and rescue applications and solutions. The fire fighter can be automatically alerted to hazards in the environment that the fire fighter is entering. The fire fighter's health status can be monitored by the team leader using wireless communication. The fire fighter's actions can be recorded for review and further training. When a head mounted display is used, the fire fighter can use augmented reality applications. For example, augmented reality applications would assist a fire fighter in locating objects not visible to the naked eye or overlay additional information on objects that are visible to the naked eye.

In a preferred embodiment of the present invention, computer 300 uses software called Damage Control Action Management Software (DCAMS), available from Electronic Innovators, Inc., 1235 Jefferson Davis Highway, Suite 411, Arlington, Va., 22002. DCAMS is software developed for the U.S. Navy for use in monitoring the containment and extinguishment of fires onboard ships. DCAMS utilizes wireless LAN communications between a team leader and fire fighters to provide safe and efficient containment of the fire. Additionally, computer 300 can use any software package that uses wireless LAN communications to enable a fire fighter and team leader to exchange data while fighting a fire. Any software that incorporates standard fire fighting symbology that can be input into plan views of a structure may be used. In addition, the fire fighter may use this software to input the type of fire or any type of damage that has occurred at a particular location. This software allows fire fighters to share data and collaborate with the team leader and other fire fighters. The software could further incorporate voice recognition applications.

Software that uses symbology of fire fighters moving about a plan view of the structure where the fire is located may also be used. Icons for each fire fighter will be shown on the fire fighter's and team leader's displays. By "clicking" on a specific fire fighter's icon, real time video and audio from that fire fighter may be accessed using wireless LAN communication.

As shown in FIG. 1, computer 300 is housed in protective computer casing 325. Protective computer casing 325 preferably acts to prevent a direct heat transfer between FPG 20 and the body of the fire fighter while still permitting computer 300 to "breathe." Protective computer casing 325 can include provisions for securing computer 300 to harness 600. Protective computer casing 325 is preferably constructed from a single layer of silicone foam fabric. The silicone foam fabric preferably comprises a silicone foam bonded, cast, or laminated to a fabric and is available from Shelby Specialty Gloves, 5321 East Shelby Drive, Memphis, Tenn. 38187.

6. I/O Box

As shown in FIG. 1, I/O box 350 is used to connect computer 300 with camera 100, battery 400 and any other peripherals that are desired to be used. In one embodiment of the present invention, I/O box comprises 4 USB ports, 2 COM ports, 1 video port, and microphone/speaker sockets. In a preferred embodiment of the present invention, the connection between computer 300 and I/O box 350 is made with a LEMO connection to ensure that the connection is secure. In another embodiment of the present invention, I/O box 350 is not used and connections are made directly between computer 300 and peripheral devices. In this embodiment, cable with a LEMO connection on one end and a "pig tail" extending from the other cable are used in place of I/O box 350. The LEMO connection is plugged into computer 300 at the port where I/O box 350 would be connected and peripheral devices are connected to the various plugs of the "pig tail" connection at the other end of the cable. Note that in this embodiment, a LEMO connection is still made directly between display unit 200 and computer 300.

As shown in FIG. 1, I/O box 350 is housed in protective I/O box casing 375. Protective I/O box casing 375 preferably acts to prevent a direct heat transfer between FPG 20 and the body of the fire fighter and includes provisions for securing I/O box 350 to harness 600. Protective I/O box casing 375 preferably is constructed from the same material used to construct protective computer casing 325.

7. Harness

Figure 6:
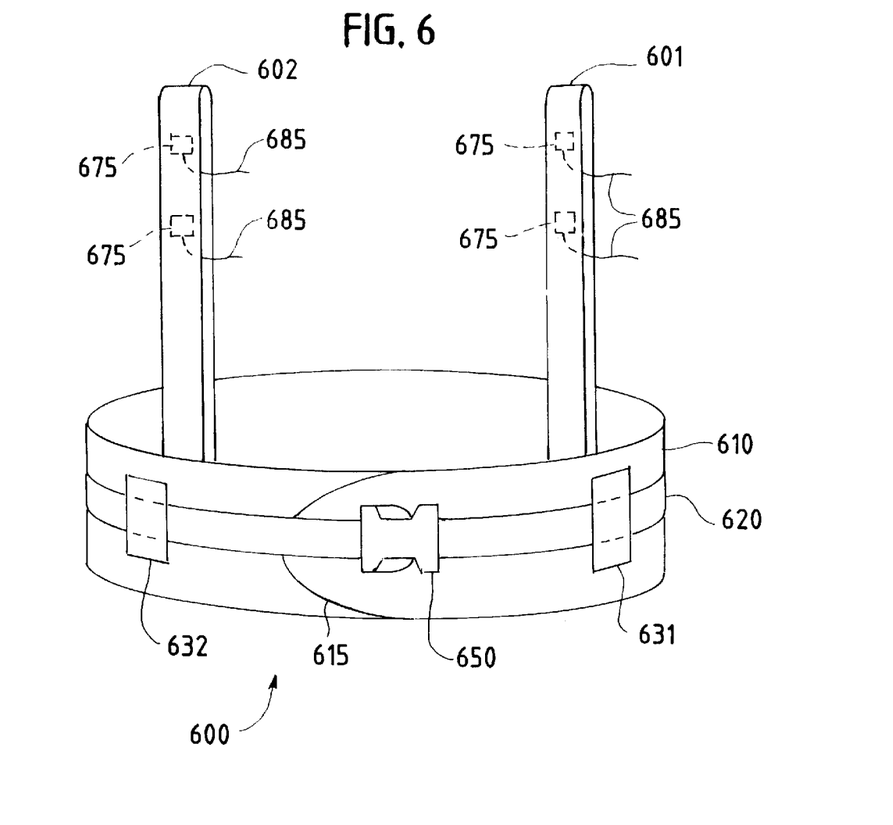
FIG. 6 is a schematic diagram of an apparatus to support components from the body of a person according to the present invention.

As shown in FIG. 1, harness 600 is used to support computer 300, I/O box 350, battery 400, and RF identification tag 500 on the upper body of fire fighter 1. As shown in FIG. 2, harness 600 is worn beneath FPG 20 and is positioned so that harness 600 will not interfere with equipment straps 31, 32, and 33 that can be worn over FPG 20. Referring to FIG. 6, a preferred embodiment of harness 600 is a standard "back support belt" commonly worn by warehouse workers to ease the strain of lifting and long hours standing on concrete floors. An inner back support belt 610 is a typical adjustable back support belt preferably with an outer hook and pile fastener tape surface. In addition to hook and pile fastener tape, any other method of fastening may be used such as buttons, snaps, and zippers. Inner back support belt 610 is adjustable to many body types because it is fastened using a hook and pile fastener tape patch located on the inside of an outer flap 615. An adjustable nylon outer belt 620 is positioned over inner back support belt 610 and is held in place using support loops 631 and 632. Harness 600 as shown in FIGS. 1 and 6 has the added benefit of providing additional lumbar support to the fire fighter wearing the present invention.

Computer 300, I/O box 350, battery 400, and RF identification tag 500 can be supported from outer belt 620 by running outer belt 620 through support loops located on the inside surfaces of protective computer casing 325, protective I/O box casing 375, protective battery casing 450, and protective RF ID tag casing 525. In a preferred embodiment, hook and pile fastener tape patches sewn onto the support loops of the protective casings prevent the protective casings from sliding about outer belt 620 because the hook and pile fastener tape patches on the support loops adhere to the outer hook and pile fastener tape surface of inner belt 610. This preferred embodiment has the added benefit of allowing other components to easily be supported from outer belt 620. In addition to this preferred embodiment, any fastener means including snaps, buttons, and zippers may be used to support the insulated casings on harness 600.

Harness 600 also comprises adjustable shoulder straps 601 and 602 that provide additional support for the fire fighter wearing the present invention. Shoulder straps 601 and 602 are adjusted so that inner belt 610 is properly positioned on the fire fighter. As shown in FIG. 2, inner belt 610 is positioned on the fire fighter's body so that equipment strap 33 is below inner belt 610.

Harness 600 shown in FIGS. 1 and 6 is a preferred embodiment of the present invention. However, there are numerous other support means that may be used to support computer 300, I/O box 350, battery 400, and RF identification tag 500 on the body of the fire fighter wearing the present invention. For example, support pockets could be installed into the inner lining of FPG 20 as substitutes for harness 600. As another example, a belt could also be incorporated into the inner lining of FPG 20.

As shown in FIG. 6, in another preferred embodiment of the present invention, health monitoring devices 675 may be incorporated into the inner surface of harness 600. Data would be sent to any available port in the I/O box via health monitor cables 685. If I/O box is not present, health monitoring cables would connect directly to the "pig tail" connection from the computer.

8. Fire Protective Gear

Referring to FIG. 2, fire protective gear 20 is worn over belt 600 and preferably protects the fire fighter, computer 300, I/O box 350, battery 400, and RF identification tag 500 from the high temperatures encountered while fighting fires. In a preferred embodiment of the present invention, standard issue United States Navy fire protection gear is used, model GUARD2000 (Navy 1), available from Lion Apparel, 6450 Poe Avenue, Dayton, Ohio 45413. However, any garment that is heat and water resistant may be used as FPG 20. In addition, any garment that is used to protect a person from external conditions, such as a hazardous material garment, may likewise be used as FPG 20.

Several modifications preferably are made to FPG 20 according to the present invention. As shown in FIG. 2, camera 100 is worn on left shoulder equipment strap 31. A hole can be made in the upper left shoulder portion of FPG 20 to permit video cable 110 to run on the inside of FPG 20 to reach I/O box 350 or computer 300. Alternatively, if camera 100 is worn on right shoulder equipment strap 32, a hole can be made in the upper left should portion of FPG 20. A "hole" can include any breach of the normal weave of the outer shell material of FPG 20 that allows the appropriate cable to be passed there through.

As shown in FIG. 2, display unit 200, which is housed in protective display casing 250, can be stored in left pocket 21 of FPG 20. A hole can be made in the inside portion of left pocket 21 to permit display cable 202 to run on the inside of FPG 20 to reach I/O box 350 or computer 300. Alternatively, if display unit 200, which is stored in protective display casing 250, is stored in the right pocket of FPG 20, a hole can be made in the inside portion of right pocket 22.

In an alternative embodiment of the present invention, rather than making holes in FPG 20, connections may be installed at the locations where the holes would be made to permit video cable 110 and display cable 202 to be plugged directly into FPG 20. An additional video cable and display cable would then be installed on the inside of FPG 20 to connect camera 100 and display 200 with I/O box 350 or computer 300.

As shown in FIG. 2, in another preferred embodiment of the present invention, health monitoring devices 25 may be incorporated into the inner surface of FPG 20. Data could be sent to any available port in the I/O box via health monitoring cables 27. If I/O box is not present, health monitoring cables could connect directly to the "pig tail" connection from the computer.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. An apparatus for enabling at least one of collaborative collection and analysis of data by a first person at a first location and a second person at a second location, comprising:

a first camera adapted to obtain first imagery and to preclude moisture intrusion;

a first display unit adapted to preclude moisture intrusion;

a speaker;

a microphone;

a computer adapted to store and to process data and adapted to be worn on said first person's body;

a first communications channel connecting said computer and said first camera;

a second communications channel connecting said computer, said microphone and said speaker;

a third communications channel connecting said computer and said first display unit;

a fourth communications channel connecting said computer and a data processor at said second location; and a support system adapted to support from said first person's body at least said first camera and said first display.

2. The apparatus recited in claim 1 wherein said first camera is adapted for use in low light applications.

3. The apparatus recited in claim 1 wherein said first camera is sealed in a rubberizing compound.

4. The apparatus recited in claim 1 wherein said first camera comprises an adjustable lens having a threaded portion, wherein said threaded portion is sealed to preclude moisture intrusion.

5. The apparatus recited in claim 1 wherein said first camera is an infrared camera.

6. The apparatus recited in claim 1 wherein said first display unit is sealed against moisture intrusion using a water resistant material.

7. The apparatus recited in claim 1 wherein said first display unit is encased in a protective casing adapted to preclude moisture intrusion.

8. The apparatus recited in claim 1 wherein said first display unit is encased in a protective casing adapted to protect said first display unit from an external heat source.

9. The apparatus recited in claim 1 wherein said first display unit is encased in a protective casing adapted to preclude moisture intrusion and to protect said first display unit from an external heat source.

10. The apparatus recited in claim 1 wherein said first display unit is adapted to be worn proximate to said first person's head.

11. The apparatus recited in claim 1 wherein said first display unit is adapted to receive data input from said first person.

12. The apparatus recited in claim 1 further comprising a second display unit.

13. The apparatus recited in claim 1 wherein said speaker and said microphone comprise a headset.

14. The apparatus recited in claim 1 further comprising instrumentation for monitoring a physical condition of said first person.

15. The apparatus recited in claim 1 wherein said computer is programmed to enable execution of functions by voice command.

16. The apparatus recited in claim 1 wherein said first communications channel comprises a video cable connecting said first camera to said computer.

17. The apparatus recited in claim 1 wherein said fourth communications channel is wireless.

18. The apparatus recited in claim 1 wherein said fourth communications channel is adapted for audio communication.

19. The apparatus recited in claim 1 wherein said fourth communications channel is adapted for video communication.

20. The apparatus recited in claim 1 wherein said fourth communications channel is adapted for data communication.

21. The apparatus recited in claim 1 wherein said third communications channel comprises a display cable connecting said first display unit to said computer.

22. The apparatus recited in claim 1 further comprising a battery adapted to provide power to at least said computer.

23. The apparatus recited in claim 1 further comprising a locating device.

24. The apparatus recited in claim 1 wherein said computer is adapted to preclude moisture intrusion.

25. The apparatus recited in claim 1 wherein said computer is adapted to transmit location data using said fourth communications channel.

26. The apparatus recited in claim 1 further comprising thermal insulation between said computer and the body of said first person.

27. The apparatus recited in claim 6 wherein said water resistant material comprises epoxy resin.

28. The apparatus as recited in claim 8 wherein said protective casing is adapted to be fire resistant.

29. The apparatus recited in claim 11 wherein said first display unit is adapted to receive data input using a stylus.

30. The apparatus recited in claim 12 wherein said second display unit is adapted to be worn proximate to said first person's head.

31. The apparatus recited in claim 12 wherein said second display unit is adapted to preclude moisture intrusion.

32. The apparatus recited in claim 12 wherein said second display unit is encased in a protective casing adapted to protect said second display unit from an external heat source.

33. The apparatus recited in claim 12 wherein said second display unit is encased in a protective casing adapted to preclude moisture intrusion and to protect said second display unit from an external heat source.

34. The apparatus recited in claim 13 wherein said headset further comprises a second display unit.

35. The apparatus recited in claim 16 wherein at least a portion of said video cable is routed underneath a garment adapted to protect said first person from at least one of heat, fire, and moisture.

36. The apparatus recited in claim 16 wherein at least a portion of said video cable is routed within a garment adapted to protect said first person from at least one of heat, fire, and moisture.

37. The apparatus recited in claim 19 wherein said video communication comprises real-time video.

38. The apparatus recited in claim 21 wherein at least a portion of said display cable is routed underneath a garment adapted to protect said first person from at least one of heat, fire, and moisture.

39. The apparatus recited in claim 21 wherein at least a portion of said display cable is routed within a garment adapted to protect said first person from at least one of heat, fire, and moisture.

40. The apparatus recited in claim 22 wherein said battery is adapted to direct explosive force in a predetermined direction in the event said battery explodes.

41. The apparatus of claim 22 further comprising a battery casing adapted to protect said battery from an external heat source.

42. The apparatus of claim 22 further comprising a battery casing adapted to receive said battery in a predetermined orientation.

43. The apparatus recited in claim 1 further comprising a second camera adapted to obtain second imagery and a fifth communications channel between said second camera and said computer.

44. The apparatus recited in claim 23 wherein said locating device comprises an RF tag.

45. The apparatus recited in claim 23 wherein said locating device comprises a GPS unit.

46. The apparatus as recited in claim 32 wherein said protective casing is adapted to be fire resistant.

47. The apparatus recited in claim 12 wherein said second display unit is adapted to overlay information upon a scene being observed by said first person.

48. The apparatus recited in claim 43 wherein said second camera is an infrared camera and said second imagery is infrared imagery.

49. An apparatus for enabling at least one of collaborative collection and analysis of data by a first person at a first location and a second person at a second location, comprising:
  a first camera adapted to obtain first imagery and to preclude moisture intrusion;
  a second camera adapted to obtain second imagery and to preclude moisture intrusion;
  a first display unit adapted to preclude moisture intrusion;
  a headset comprising a speaker and a microphone;
  a computer adapted to store and to process data, to be worn on said first person's body and to preclude moisture intrusion;
  a first communications channel connecting said computer and said first camera;
  a second communications channel connecting said computer and said headset;
  a third communications channel connecting said computer and said first display unit;
  a fourth communications channel connecting said computer and a data processor at said second location;
  a fifth communications channel connecting said computer and said second camera;
  a support system adapted to support from said first person's body at least said first camera and said first display.

50. The apparatus recited in claim 49 further comprising a battery adapted to provide power to at least said computer.

51. The apparatus recited in claim 50 wherein said battery is adapted to direct explosive force in a predetermined direction in the event said battery explodes.

52. A method for enabling collaboration between a first person at a first location and a second person at a second location during the performance of an activity, comprising the steps of:

locating a wearable computer proximate to said first location;

obtaining video imagery relevant to said activity;

storing said video imagery in said wearable computer;

obtaining data concerning said first person's physical condition;

storing said data concerning said first person's physical condition in said wearable computer;

obtaining data concerning said first person's location;

storing said data concerning said first person's location in said wearable computer;

providing data generated by said first person to said wearable computer using an interactive display;

transmitting at least one of said video imagery, said data concerning said first person's physical condition, and said data concerning said first person's location from said computer to said second person at said second location;

transmitting data concerning said activity from said second person to said computer;

displaying to said first person data corresponding to at least one of said video imagery, said data concerning said first person's physical condition, said data concerning said first person's location, and said data concerning said activity to said first person.

53. The method as recited in claim 52 wherein said step of obtaining video imagery is carried out to obtain real-time video imagery.

54. The method as recited in claim 52 wherein said step of obtaining data concerning said first person's physical condition is carried out to obtain real-time data.

55. The method as recited in claim 52 wherein said step of obtaining data concerning said first person's location is carried out to obtain real-time data.

56. The method recited in claim 52 wherein said video imagery relevant to said activity is infrared video imagery.

57. The method recited in claim 52 wherein said step of obtaining data concerning said first person's location is accomplished using an RF tag.

58. The method recited in claim 52 wherein said step of obtaining data concerning said first person's location is accomplished using a GPS unit.

59. The method recited in claim 56 wherein said infrared video imagery is real-time infrared video imagery.

60. The method as recited in claim 56 wherein said step of obtaining infrared video imagery is carried out to locate one or more other persons.

61. The method as recited in claim 56 wherein said step of obtaining infrared video imagery is carried out to determine temperature at one or more locations throughout a fire.

62. The method as recited in claim 56 wherein said step of obtaining infrared video imagery is carried out to inspect an area for one or more hot spots.

63. A method of firefighting, comprising the steps of:

providing location data indicating the location of a firefighter to a computer network;

providing video data relevant to said location to said computer network;

providing physical condition data indicating the physical condition of said firefighter to said computer network;

providing data generated by said firefighter using an interactive display and stylus to said computer network;

communicating at least one of said location data, said video data, said physical condition data, and said data generated by said firefighter to a team leader via said computer network;

providing instruction data comprising instructions from said team leader to said computer network; and communicating said instruction data to said fire fighter.

64. The method recited in claim 63 further comprising the step of providing said video data to said firefighter.

65. A method of firefighting, comprising the steps of:

providing location data indicating the location of each of a plurality of firefighters to a computer network;

providing video data relevant to each of said locations to said computer network;

providing physical condition data indicating the physical condition of each of said plurality of firefighters to said computer network;

providing data generated by any of said plurality of firefighters using an interactive display and stylus to said computer network;

communicating at least one of said location data, said video data, said physical condition data, and said data generated by any of said plurality of firefighters to a team leader via said computer network;

providing instruction data comprising instructions from said team leader to said computer network; and communicating said instruction data to any of said plurality of fire fighters.

66. The method recited in claim 65 further comprising the step of providing any of said video data to any of said plurality of firefighters.

67. The method recited in claim 65 further comprising the step of providing augmented reality data to any of said plurality of firefighters.

* * * * *